United States Patent [19]

Freitag et al.

[11] Patent Number: 4,595,182
[45] Date of Patent: Jun. 17, 1986

[54] CONSTRUCTION ASSEMBLY

[75] Inventors: Herbert Freitag, Koblenz-Metternich; Gerhard Reichert, Neuwied, both of Fed. Rep. of Germany

[73] Assignee: Stabilus GmbH, Fed. Rep. of Germany

[21] Appl. No.: 568,370

[22] Filed: Jan. 5, 1984

[30] Foreign Application Priority Data

Jan. 19, 1983 [DE]  Fed. Rep. of Germany ....... 3301544

[51] Int. Cl.$^4$ .............................................. F16F 5/00
[52] U.S. Cl. .................................. 267/120; 267/64.12
[58] Field of Search ................. 267/120, 64.11, 64.12; 188/282, 284, 317, 322.15, 322.22; 16/52, 66, 84

[56] References Cited

U.S. PATENT DOCUMENTS

| | | | |
|---|---|---|---|
| 3,963,227 | 6/1976 | Molders | 267/120 |
| 4,066,279 | 1/1978 | Kaptanis | 280/711 |
| 4,156,523 | 5/1979 | Bauer | 267/120 |
| 4,307,875 | 12/1981 | Schnitzius et al. | 267/120 |
| 4,323,224 | 4/1982 | Freitag et al. | 267/120 |
| 4,433,759 | 2/1984 | Ichinose | 188/282 |

*Primary Examiner*—Bruce H. Stoner, Jr.
*Assistant Examiner*—Alvin Oberley
*Attorney, Agent, or Firm*—Brumbaugh, Graves, Donohue & Raymond

[57] ABSTRACT

A flap member, e.g. a trunk lid of a motor vehicle, is pivotally mounted on a framework, e.g. a motorcar framework. The flap member is assisted in its upward movement by a gas spring. The thrust of the gas spring biases the flap member towards an upper position. In this upper position further upward movement of the flap member is locked by a relief pressure valve between the working chambers of the gas spring. By applying external force to the flap member assisting the thrust of the gas spring, the flap member may be moved beyond said upper position while opening said relief pressure valve. If the external upward directed force ceases the relief pressure valve closes again and the flap member is maintained in the new position by the thrust of the gas spring and the locking action of the relief pressure valve. When the flap member is to be lowered, an external force is applied opposite to the trunk lid and as a result thereof a direction-responsive is opened in parallel to the relief pressure valve.

5 Claims, 2 Drawing Figures

CONSTRUCTION ASSEMBLY

BACKGROUND OF THE INVENTION

In motorcars and other construction assemblies flap members which are pivotally mounted about a horizontal axis and which are to be moved upwards and downwards frequently can be assisted by gas springs. The gas springs compensate for the weight of the flap member so that the user can move the flap member downwards and upwards with a minimum force.

STATEMENT OF THE PRIOR ART

In a widely used motorcar construction as published e.g. in U.S. Pat. No. 3,963,227 a trunk lid is pivotally mounted about a horizontal axis on the framework of a motorcar. A gas spring is provided between the framework of the motorcar and the trunk lid. The gas spring has such a thrust that the trunk lid is automatically lifted after the trunk lid lock has been unlocked. The thrust of the gas spring maintains the trunk lid in an upper position which is defined by abutments which are either provided within the gas spring or on the motorcar frame, on the one hand, and on the trunk lid, on the other hand.

The abutments are normally chosen in such a position that a tall person has easy access to the cabin of the motorcar without the risk of collision of his head with the edge of the trunk lid. On the other hand, in such position of the trunk lid smaller persons may have difficulties to grip the trunk lid in order to move it down to its closed position.

From U.S. Pat. No. 4,307,875 a motorcar construction is known comprising a framework of a motorcar and a trunk lid pivotally mounted thereto for pivotal movement about a substantially horizontal axis through a basic path of angular movement between a first or lower angular position (closed position) and a second or upper angular position (intermediate position). A gas spring is pivotally connected to the framework and to the trunk lid for assisting upward movement of the trunk lid. The cylinder member has a cylinder axis and is provided with a bottom wall at one end thereof and a piston rod sealing and guiding unit adjacent the other end thereof such as to define a cavity axially between the bottom wall and the sealing and guiding unit. A piston rod extends inwardly and outwardly of the piston rod sealing and guiding unit and is sealingly guided therethrough for axial movement inwardly and outwardly of the cavity through a basic path of axial movement corresponding to said basic path of angular movement between a first or inner axial position corresponding to said first or lower angular position of said trunk lid and a second or outer axial position corresponding to said second or upper angular position of said trunk lid. A piston unit is fixed to the piston rod within the cavity and divides the cavity into two working chambers, a first working chamber surrounding the piston rod and a second working chamber on the side of the piston unit remote from the piston rod. A fluid path system is provided between the two working chambers. A pressurized fluid is provided within the cavity exerting an outwardly directed thrust onto the piston rod. This thrust is not sufficient to overcome the gravitational forces acting onto the trunk lid. An external force is, therefore, necessary for moving the trunk lid upwards. Through the basic path of axial movement of the piston rod a first fluid path responsive to the axial position of the piston rod is open. No substantial throttling of fluid flow occurs between the two working chambers when the piston rod is axially moved with respect to the cylinder member within the basic path of axial movement. This basic path of axial movement corresponds to a short basic path of angular movement between the closed position (first or lower angular position) of the the trunk lid and a nearly closed position (second or upper angular-position). The length of the basic angular path of movement is chosen such that in closing the trunk lid it can be accelerated through said basic path of angular movement such as to be locked by an automatic lock. When the trunk lid is moved upwards beyond the second angular position, the first fluid path is closed. In order to make the cabin of the motorcar accessible the trunk lid is moved far beyond the basic path of movement through an additional path of movement. Fluid from the first working chamber can escape to the second working chamber through a second fluid path containing a direction-responsive valve. This direction-responsive valve opens from said first working chamber to said second working chamber in response to outwardly directed movement of the piston rod. When the external force lifting the trunk lid in opening direction ceases within the additional path of movement, the gravitational force tries to return the trunk lid towards the closed position. As, however, the direction-responsive valve is closed on beginning of inward movement of the piston rod, this inward movement is locked. So the piston rod can be brought to any wanted position within the additional path of movement. If one finally wants to close the trunk lid, an external force is to be applied to the trunk lid in closing direction. By this external closing force a relief pressure valve provided in a third fluid path between the working chambers is opened so as to allow fluid flow from the second to the first working chamber.

This known construction is successful in operation. It is, however, sometimes objected that in this known construction the user must always apply an external force in order to open the trunk lid.

OBJECT OF THE INVENTION

It is an object of the present invention to provide a construction in which a trunk lid or generally spoken a flap member is automatically lifted through a basic path of movement to a position in which it is accessible for persons of normal and smaller size and in which the trunk lid or generally spoken the flap member can be lifted and arrested by hand beyond said basic path of angular movement to an angular position as wanted particularly by persons of taller size.

SUMMARY OF THE INVENTION

In accordance with the present invention a construction assembly comprises a basic construction unit. A flap member is pivotally mounted on said basic construction unit for pivotal movement about a substantially horizontal axis through a basic path of angular movement between a first or lower angular position and a second or upper angular position. At least one gas spring is pivotally connected to said basic construction unit and to the flap member for assisting movement of the flap member within the basic path of angular movement against the action of gravitational forces. The gas spring comprises a cylinder member having a cylinder axis and being provided with a bottom wall at one end thereof and a piston rod sealing and guiding unit adjacent the other end thereof such as to define a cavity axially between said bottom wall and said sealing and guiding unit. A piston rod extends inwardly and outwardly of said piston rod sealing and guiding unit and is sealingly guided therethrough for axial movement inwardly and outwardly of the cavity through a basic path of axial movement corresponding to the basic path of angular movement between a first or inner axial position corresponding to the first or lower angular position of the flap member and a second or outer axial position corresponding to the second or upper angular position of the flap member. A piston unit is fixed to the piston rod within the cavity and divides the cavity into two working chambers, a first working chamber surrounding the piston rod and a second working chamber on the side of the piston unit remote from the piston rod. A fluid path system extends between the first and the second working chambers. A pressurized fluid is contained within the cavity exerting an outwardly directed thrust onto the piston rod. This thrust is such as to overcome the gravitational forces acting onto the flap member at least in a partial section of the basic path of angular movement adjacent the second angular position.

In such a construction assembly the improvement consists in that said flap member is movable beyond said second angular position through an additional path of angular movement and said piston rod is movable beyond said second axial position through an additional path of axial movement corresponding to said additional path of angular movement. Moreover, the fluid path system comprises a first fluid path responsive to the axial position of said piston rod along said cylinder axis such as to be open along said basic path of axial movement and to be closed along said additional path of axial movement. Furthermore, the fluid path system comprises a second fluid path between said two working chambers with relief pressure valve means opening from said first working chamber towards said second working chamber in response to a predetermined pressure differential between a higher pressure in said first working chamber and a lower pressure in said second working chamber. Furthermore, the fluid path system comprises a third fluid path between said two working chambers with direction-responsive valve means opening from said second working chamber to said first working chamber in response to inwardly directed movement of said piston rod.

In view of a reliable and economic design of the gas spring the first fluid path may be defined by a substantially axially extending groove extending along an internal face of said cylinder member.

In view of precisely determining the limit between the basic path of movement and the additional path of movement, it is desirable to provide relief pressure valve means having such a characteristic as to be opened in said additional path of axial movement only if said thrust is assisted by applying an external force.

The construction assembly of this invention combines the advantages of the known constructions as described above and avoids their disadvantages. It is to be noted that with the construction assembly of this invention a relative small external force is to be exerted both in upward movement of the flap member through the additional path of movement and in downward movement of the flap member through the total path of movement. Particularly in the basic path of movement the external force to be applied for moving the flap member downwards can be kept very small if the gravitational forces and the thrust of the gas spring are in substantial balance.

The second or upper angular position of the flap member is—in the case of a motorcar with a trunk lid—such that the cabin of the motorcar is accessible in said second or upper angular position for persons of normal and smaller size.

Other features, additional objects and many of the attendant advantages will readily be appreciated as the same becomes better understood by reference to the following detailed description of preferred embodiments when considered in connection with the appended drawings.

DETAILED DESCRIPTION OF THE DRAWING

Figure 1:
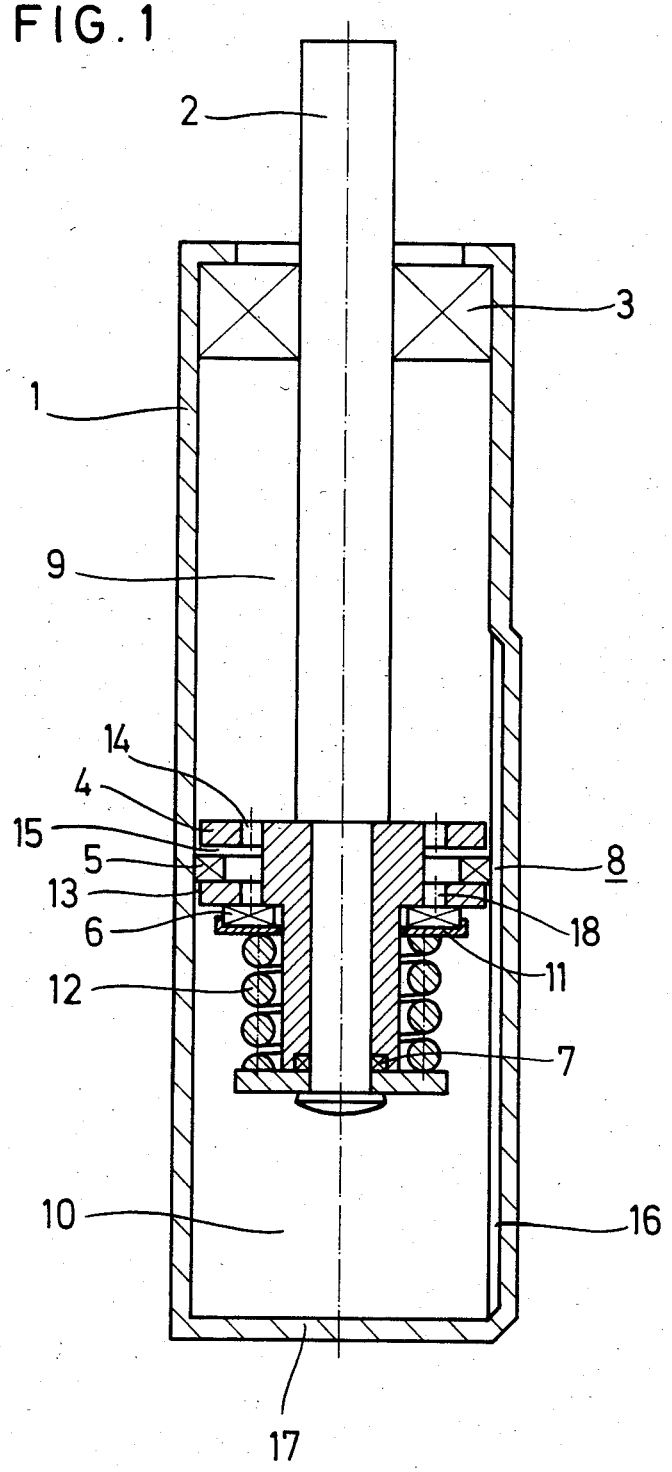
FIG. 1 shows a longitudinal section of a gas spring to be used in connection with a construction assembly of this invention and FIG. 2 shows diagrammatically a construction assembly of this invention.

The gas spring possesses a cylinder 1 entered by a piston rod. The piston rod seal and guide 3 is situated at the piston rod exit end of the cylinder 1, while in the interior of the cylinder the piston rod 2 is firmly connected with a piston 4 and this piston 4 divides the cavity of the cylinder into two working chambers 9 and 10. This cavity is provided with a gas filling under pressure, and the product of the gas pressure multiplied by the piston rod cross-sectional area equals the outward thrust of the piston rod. The outward thrust and the articulated attachment of the gas spring to the construction assembly are designed so that the flap opens automatically as from a specific angle of opening. A piston ring 5 is axially movably arranged in an annular groove 15 of the piston 4 and together with the overflow cross-section 14 and the annular gap 13 forms a direction-responsive valve. A relief pressure valve consists of the valve body which is guided in a sleeve 11 and pressed by a valve spring 12 against a valve seat transversed by the valve opening 18. The gasket 7 serves to seal the piston 4 against the piston rod extension. The working chambers 9 and 10 are connectable with one another by means a fluid path opening and closing in response to the axial position of the piston 4. For the automatic outward thrust of the piston rod 2 the fluid path 8 is effective over a relatively large path of axial movement of the gas spring and is formed in a simple manner by a groove 16 extending from the cylinder bottom 17 over the major axial length of the cylinder 1. In the remainder of the length of the cylinder the groove 16 is omitted.

Figure 2:
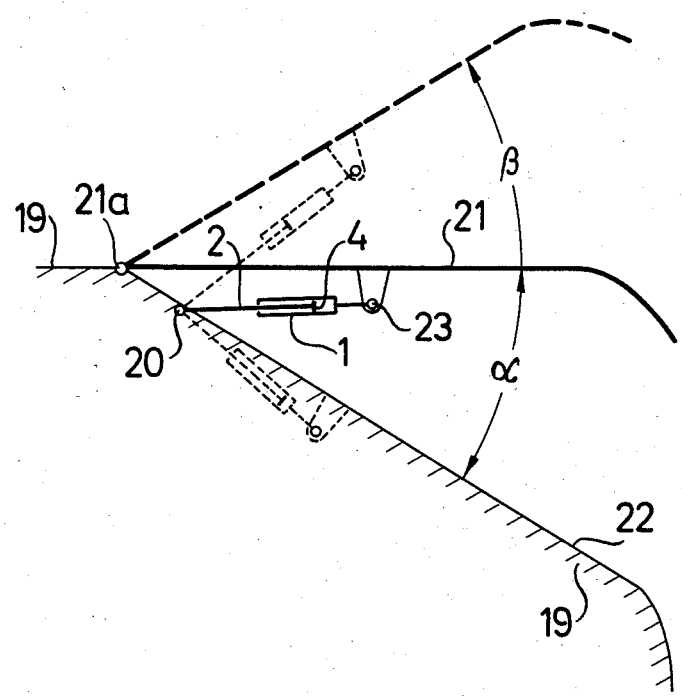

In FIG. 2 the piston rod 2 is pivotally connected to a motor vehicle frame 19 at 20 and to a trunk lid 21 at 22. The trunk lid 21 is hinged to the frame 19 at 21a. The trunk lid 21 is shown in FIG. 2 in its second or upper position. In its first or lower position the trunk lid 21 coincides with the edge 22 of the motorcar frame. The basic path of angular movement is defined by $\alpha$. The additional range of angular movement is defined by $\beta$. When the trunk lid is closed the piston rod 2 is substantially within the cylinder 1. Since the articulation points 20, 22 of the gas spring are preferably designed so that shortly before the trunk lid enters the lock the gas spring exerts a closing force, in the opening of the trunk lid a slight distance must be travelled by hand before the outward thrust of the piston rod 2 is sufficient to overcome the weight of the trunk lid. In this outward movement of the piston rod 2 the piston ring 5, which is axially movable in the annular piston groove 15, places itself against the lower groove surface as shown in FIG. 1 so that the annular gap 13 is closed. This occurs due to the fact that the piston ring 5 bears with radial stress on the inner wall of the cylinder 1 and thus a friction force between the inner wall of the cylinder 1 and the piston ring 5 effects the tight closure of the annular gap 13. During the outward automatic movement of the piston rod 2 the constricted cross-section formed by the groove 16 determines the outward speed of movement of the piston rod. The cross-section of the groove 16 may be constant or variable along its axial length in accordance with the wanted damping characteristics. The automatic outward thrust of the piston rod 2 and thus the automatic opening of the trunk lid 21 are terminated when the piston ring 5 reaches the end of the groove 16 and thus the first fluid path 8 between the working chambers 9 and 10 is closed. This position of the piston 4 in FIG. 1 corresponds to the full-line position of the trunk lid 21 in FIG. 2.

If in special cases a greater opening of the trunk lid is desired, it is sufficient if an external force acting in the opening direction is exerted upon the trunk lid by hand, whereby the pressure in the working chamber 9 increases and thus the valve member 6 is lifted away from the valve opening 18, against the force of the valve spring 12, so that the gas flows over from the working chamber 9 into the working chamber 10. As soon as the trunk lid is released it remains in the position in which it was before said releasing due to the thrust of the gas spring, on the one hand, and the locking action of the valve member 6, on the other hand.

For the closure of the trunk lid it is only necessary to act upon it by hand so as to overcome the outward thrust of the gas spring exceeding the weight of the trunk lid, since the piston ring 5, as a result of the friction on the inner wall of the cylinder 1, in the inward movement of the piston rod 2 applies itself to the upper surface of the annular groove 15 as seen in FIG. 1 and thus clears the annular gap 13, so that the gas can flow out of the working chamber 10 by way of the annular gap 13 and the overflow cross-section 14 into the working chamber 9. The cross-sectional area of the annular gap 13 is such that the pushing in of the piston rod 2 can be effected within the additional path of movement $\beta$ with the same force as in the basic path of movement $\alpha$.

Since the length of the groove 16 limits the automatic outward thrust of the gas spring, the design of the length of the groove can be chosen such that even relatively small persons can close the trunk lid without trouble and the larger trunk lid opening is used only in case of need.

In place of the first fluid path 8 formed by the groove 16 such a first fluid path can also be formed by a by-pass which starts from the region of the cylinder bottom 17 and opens in the cylinder 1 at the point where the automatic outward thrusting of the piston rod 2 is to be terminated.

The spring-loaded valve 12, 6, 18 can be modified in design. By way of example the valve opening 18 can be covered by a valve disc coaxial with the piston 4. This valve disc and a cup spring associated thereto may be fixed to the piston by an extension of the piston rod.

It should be understood that the foregoing disclosure relates only to a preferred embodiment of the invention and that it is intended to cover all changes and modifications of the example of the invention here enclosed for the purpose of the disclosure which do not constitute departures from the spirit and scope of the invention as set forth in the appended claims. It is further to be noted that the reference numbers in the claims are only used in view of facilitating the understanding of the claims, but are not to be regarded as restrictive.

What is claimed is:
1. In a construction assembly comprising
   (a) a basic construction unit;
   (b) a flap member pivotally mounted on said basic construction unit for pivotal movement about a substantially horizontal axis through a basic path of angular movement between a first or lower angular position and a second or upper angular position;
   (c) at least one gas spring pivotally connected to said basic construction unit and to said flap member for assisting movement of said flap member within said basic path of angular movement against the action of gravitational forces, said gas spring comprising
      (ca) a cylinder member having a cylinder axis and being provided with a bottom wall at one end thereof and a piston rod sealing and guiding unit adjacent the other end thereof such as to define a cavity axially between said bottom wall and said sealing and guiding unit;
      (cb) a piston rod extending inwardly and outwardly of said piston rod sealing and guiding unit and being sealingly guided therethrough for axial movement inwardly and outwardly of said cavity through a basic path of axial movement corresponding to said basic path of angular movement between a first or inner axial position corresponding to said first or lower angular position of said flap member and a second or outer axial position corresponding to said second or upper angular position of said flap member;
      (cc) a piston unit fixed to said piston rod within said cavity and dividing said cavity into two working chambers, a first working chamber surrounding said piston rod and a second working chamber on the side of said piston unit remote from said piston rod;
      (cd) a fluid path system between said first and said second working chambers;
      (ce) a pressurized fluid within said cavity exerting an outwardly directed thrust onto said piston rod, said thrust being sufficient to overcome said gravitational forces acting onto said flap member at least in a partial section of said basic path of angular movement adjacent said second angular position;
the improvement including:
   (d) said flap member is movable beyond said second angular position through an additional path of angular movement and said piston rod is movable beyond said second axial position through an additional path of axial movement corresponding to said additional path of angular movement, and wherein the thrust directed outwardly onto said piston rod by said pressurized fluid is sufficient to overcome said gravitational forces acting onto said flap member in said additional path of angular movement such that within this additional path of angular movement said flap arrestable along said path in each position along said path by said thrust on the one hand and the pressurized fluid in the first working chamber on the other hand;

(e) said fluid path system comprises a first fluid path responsive to the axial position of said piston rod along said cylinder axis such as to be open along said basic path of axial movement and to be closed along said additional path of axial movement;

(f) said fluid path system further comprises a second fluid path between said two working chambers with relief pressure valve means opening from said first working chamber towards said second working chamber in response to a predetermined pressure differential between a higher pressure in said first working chamber and a lower pressure in said second working chamber, said relief pressure valve means comprising a valve member closing said second fluid path under the action of a spring means, said spring means biasing said valve member towards a closed position such as to elastically throttle the flow of liquid through said second fluid path during the movement of the flap member substantially along the total additional path of angular movement under the action of an externally applied force; and (g) said fluid path system further comprises a third fluid path between said two working chambers with direction-responsive valve means, said direction-responsive valve means opening from said second working chamber to said first working chamber in response to inwardly directed movement of said piston rod.

2. A construction assembly as set forth in claim 1, said first fluid path being defined by a substantially axially extending groove extending along an internal wall of said cylinder member.

3. A construction assembly as set forth in claim 1, said relief pressure valve means having such a characteristic as to be opened in said additional path of axial movement only if said thrust is assisted by applying an external force.

4. A construction assembly as set forth in claim 1, said direction-responsive valve means defining in their opened condition a flow cross-sectional area such that inward movement of said piston rod can be performed without substantial fluid-dynamic resistance.

5. A construction assembly as set forth in claim 1, wherein the spring means is supported by a support member at the end of the piston rod between the end of the piston rod and the piston unit.

* * * * *